United States Patent

[11] 3,584,811

| [72] | Inventors | Lionel Edward Leavy Bramhall; John Taylor, Hyde, both of, England |
|---|---|---|
| [21] | Appl. No. | 820,259 |
| [22] | Filed | Apr. 29, 1969 |
| [45] | Patented | June 15, 1971 |
| [73] | Assignee | Hawker Siddeley Aviation Limited Kingston-upon-Thames, Surrey, England |
| [32] | Priority | Apr. 30, 1968 |
| [33] | | Great Britain |
| [31] | | 20512/68 |

[54] DEVICES OF PRODUCING AERODYNAMIC LIFT
4 Claims, 1 Drawing Fig.

[52] U.S. Cl. .................................................. 244/42, 244/87, 416/20
[51] Int. Cl. ..................................................... B64c 3/38
[50] Field of Search ........................................... 244/42.5, 42.48, 42.47, 42.41, 42.4, 42, 42.1, 40.5, 40.6, 39, 40, 34, 34.1, 41, 35, 35.1, 21, 10, 1, 82, 82.5, 82.1, 78, 75—76, 86—91; 115/12; 239/562—565, 567, 543, 548, 554, 457, 566; 137/625.47, 625.16; 251/310, 311; 416/20, 90

[56] References Cited
UNITED STATES PATENTS

| 3,109,494 | 11/1963 | Davidson et al. | 416/20 |
| 3,348,618 | 10/1967 | Flint et al. | 416/90 |
| 3,362,660 | 1/1968 | Tyler | 244/75 |

*Primary Examiner*—Milton Buchler
*Assistant Examiner*—F. K. Yee
*Attorney*—Dowell & Dowell ABSTRACT: An aerodynamic lift-producing body for an aircraft, in the form of a blown pole, in which air can be blown selectively in either circumferential direction over the outer surface of the pole, or in both directions simultaneously.

PATENTED JUN 15 1971
3,584,811
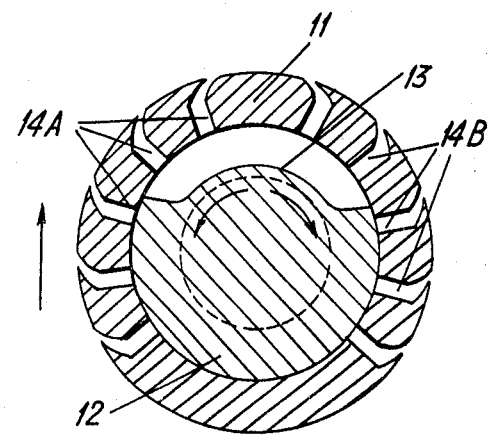
Inventors
Lionel Edward Leavy
John Taylor
By
Dowell rt Dowell
Attorneys

DEVICES OF PRODUCING AERODYNAMIC LIFT

This invention relates to devices for producing aerodynamic lift.

It is known that lift can be produced by a circular or airfoil-shaped member placed with its longitudinal axis at right angles to a stream of air when, at the same time, a circulation of air is induced round the member by means of blowing air from the inside out over the outer surface through tangentially placed slots. The use of such members has been proposed for lifting surfaces, for example in the form of rotating poles for helicopters or controls for conventional aircraft. The application in conventional aircraft appears particularly attractive for short takeoff aircraft as the problem of control, by conventional means, is difficult when the aircraft itself has little forward speed.

Such circular, elliptical or airfoil cross section members with forced air circulation are generally referred to as blown poles. When using a blown pole as a control surface it is of great importance to obtain rapid response to any input signals given by the pilot. A further requirement is that the control member itself, particularly when it is not in use, should not impose too much drag and that, if necessary the drag increment due to the pole should be, itself, controllable. It is an object of the invention to fulfill these requirements and also achieve other benefits.

According to the present invention, a pole member is provided which has two sets of tangential slots, such that air can be blown to induce circulation in either direction, or air can be blown in both directions at once. With this arrangement, for a given direction of movement of the pole itself relative to the surrounding air it is possible to obtain a control force in either direction at right angles to the direction of movement. Thus, if connection of one set of slots to the air supply produces lift, by connecting instead the other set of slots to the air supply negative lift will be obtained. In the absence of any blowing some drag will result but this can be reduced substantially or completely to zero if a small amount of air is blown in both directions at once.

One form of construction in accordance with the invention will now be described by way of example with reference to the accompanying drawing, which shows a blown pole in cross section.

It would be possible to connect the two sets of slots, in a blown pole embodying the invention, to a common source of compressed air, via a system of piping and valves whereby the amount of air expelled through either set of slots was controlled in accordance with pilot's command signals. Such a system, however, would produce a very slow response rate. Also there would be undesirable duplication of pipes which, in the interest of reducing losses, must be kept as large in diameter as possible.

A better scheme is illustrated in the drawing, which shows a blown pole 11 in the form of a sleeve into which is fitted a rotatable hollow inner liner 12. The air supply enters the pole through the hollow liner 12 which has ports 13 cut in its outer surface and extending roughly over 120° of its periphery. Only these slots 14 in the outer sleeve 11 which are opposite to a portion of a port 13 of the inner liner will be in connection with the supply of compressed air and the circulation flow will issue only from such openings. With an appropriate arrangement of the external slots 14 and the ports 13 of the inner liner, one can obtain circulation either wholly in one direction by supplying air solely to one set of external slots 14A, or wholly in the other direction by supplying air solely to the other set of slots 14B. And airflow will occur partially in both directions when the inner liner 12 is in the relative angular position shown. Also by suitably dimensioning the relative ports an angular position of the liner 12 is made available in which the blowing air is shut off completely. Separate control of the amount of air flowing in either one direction is also possible. As the path from the ports in the rotating liner 12 to the external surface of the pole is very short the response giving the lift of the required magnitude and direction will follow almost instantaneously the pilot's command signals.

Such a blown pole member in which the direction and magnitude of lift is controllable, and where by blowing out of suitably selected slots drag can be reduced substantially to zero, is suitable for installation in a variety of positions on an airplane. These members can be provided at or near the wing tips where they can be fixed or retractably mounted as required. They can be used in conjunction with or as a replacement for the usual tail surfaces, or they can be used as the equivalent of flaps to increase the lift coefficient of the wing.

It will be understood that the layout of porting and slots in the particular example illustrated is only one of a number of port configurations that can be employed to achieve essentially equivalent results.

We claim:

1. A device for producing aerodynamic lift, of the blown pole type, comprising an outer sleeve having a first group of slots angled to direct issuing air in one circumferential direction to induce air circulation around the sleeve in that direction, and a second group of slots angled oppositely to said first group of slots to direct issuing air in the opposite circumferential direction to induce air circulation around the sleeve in said opposite direction, and a hollow inner liner disposed coaxially and concentrically within said outer sleeve and angularly movable relatively thereto about the axis of the sleeve, the blowing air being delivered via the interior of the inner liner to at least one port in the liner wall that can be placed by said relative angular movement selectively in communication with said groups of angled slots in the outer sleeve.

2. A device according to claim 1, arranged such that the inner liner can be rotated to a position where the port therein is in communication with substantially equal numbers of slots from both groups.

3. A device according to claim 1, arranged such that the inner liner can be turned to a position in which communication between the interior thereof and any of the slots in the outer sleeve is cutoff.

4. An aircraft fitted with a blown pole device according to claim 1.